Sept. 17, 1935.  R. J. NEELY  2,014,861
MANHOLE COVER FOR TANKS
Filed July 10, 1934
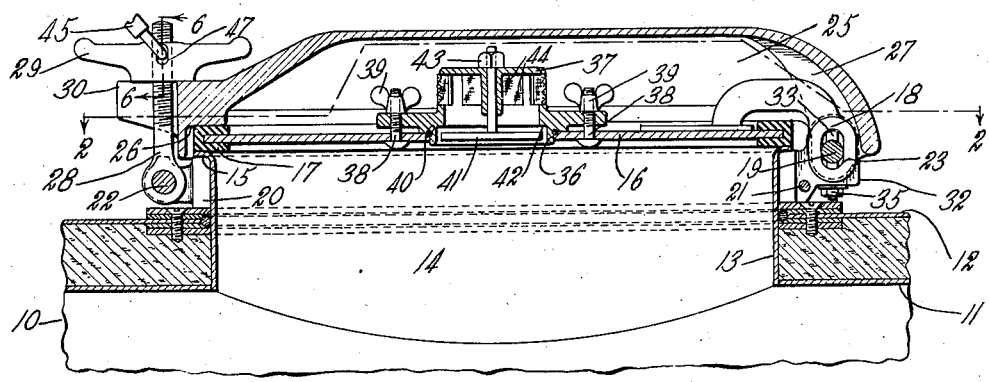
Fig. 1.
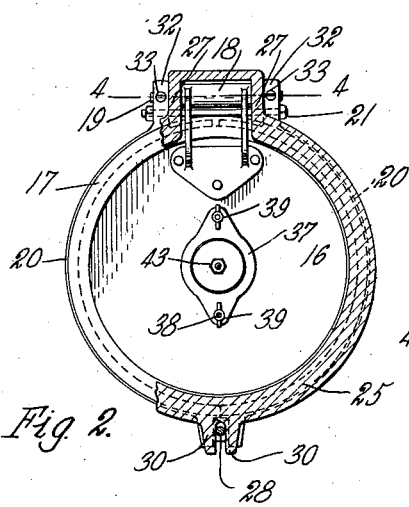
Fig. 2.
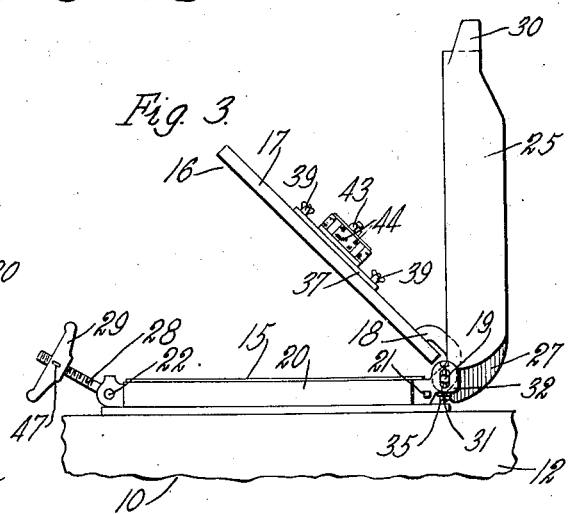
Fig. 3.
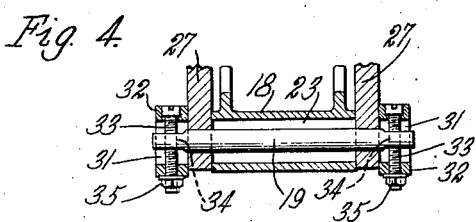
Fig. 4.
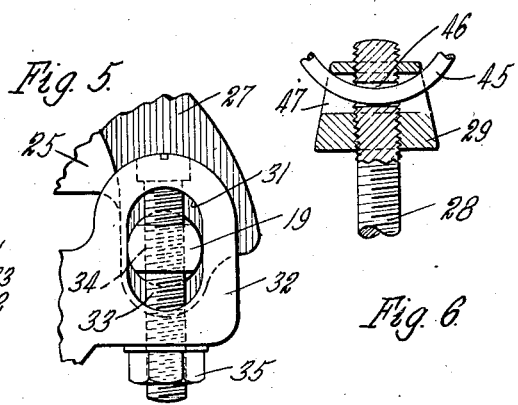
Fig. 5.
Fig. 6.
INVENTOR
Raymond J. Neely
by
Parker, Brochnow & Harmer
ATTORNEYS.

Patented Sept. 17, 1935

2,014,861

UNITED STATES PATENT OFFICE 2,014,861

MANHOLE COVER FOR TANKS

Raymond J. Neely, Little Falls, N. Y., assignor to Cherry-Burrell Corporation, Chicago, Ill., a corporation of Delaware Application July 10, 1934, Serial No. 734,441

9 Claims. (Cl. 220—55)

This invention relates to improvements in manhole covers for tanks, particularly milk truck tanks. The manhole covers of this sort, which are of relatively large diameter, are hinged or mounted so as to adapt them to be opened to afford ready access into the tank, and are commonly made with one or more small diameter openings therethrough provided with suitable closure devices adapting them for use for filling the tank without opening the large manhole cover or for the reception of an air vent valve or other fitting used in the operation of the tank. It is important for sanitary purposes, especially in the case of milk truck tanks, to protect such openings or fittings from dust or other contamination, and some health ordinances require the provision of dust or protecting hoods over the manhole covers.

One object of this invention is to provide a combined manhole cover and protecting hood of novel and desirable construction.

Other objects of the invention are to provide a manhole cover which is movable to open and close the manhole and may be equipped with a filling device, vent valve or other fitting, and a hood which protects said fittings and also serves as the clamping or securing means for the cover; also to provide a combined manhole cover and protecting hood of light and desirable construction and capable of easy operation, which will insure a perfect sealing of the cover uniformly around the rim of the manhole; also to construct the device so as to insure the perfect seating and sealing of the cover notwithstanding inaccuracies of manufacture or variations in the sealing gasket for the cover, due to wear or permanent compression thereof; and also to provide a manhole cover having the other features of improvement herein-described and set forth in the claims.

In the accompanying drawing:

Fig. 1 is a sectional elevation of a combined manhole cover and protecting hood embodying my invention.

Fig. 2 is a sectional plan view thereon, on a reduced scale, on line 2—2, Fig. 1.

Fig. 3 is a sectional elevation thereof showing the cover and hood open.

Fig. 4 is a transverse section through the cover and hood hinges on line 4—4, Fig. 2.

Fig. 5 is an enlarged elevation showing the hinge adjusting means for the hood.

Fig. 6 is a detail section on line 6—6, Fig. 1.

10 represents the upper portion of a tank, for instance, a milk truck tank such as are commonly constructed with a lining 11 made of metal or material adapted for contact with the milk or other contents of the tank, and an outer insulating jacket 12. The drawing illustrates a tank of this type in which the lining is provided with a projecting neck or portion 13 extending out through an opening in the insulating jacket and forming the walls of the manhole 14 of the tank. The neck shown is provided at its upper end with an out-turned flange or rim 15 against the flat end face of which the manhole cover 16 is adapted to seat for closing the manhole.

The cover 16 shown consists of a circular disk provided with a peripheral rubber or other suitable packing gasket 17, which is preferably of channel cross section and straddles the marginal portion of the disk and is adapted to tightly seal the manhole when the cover is pressed or clamped against the rim 15. The cover is movably mounted to open and close, preferably by a hinge arm 18 fixed to the cover disk inwardly from the sealing gasket or margin of the cover, and hinged by a pin 19 to a base ring 20 which is secured on the tank surrounding the neck 13 outside of the insulating jacket. The base ring 20 may be, as shown, a split ring composed of two halves clamped about the neck 13 by a bolt 21 at one side of the neck and by the pivot pin 22 for a cover-securing device at the opposite side of the neck or in any other suitable manner. The hinge pin 19 passes through a slot 23 in the hinge arm 18, and this slot 23 is preferably elongated in a direction parallel with the axis of the manhole so that the cover, in addition to swinging about the hinge pin, is allowed a limited movement normal to the plane of the rim 15 to insure that the marginal gasket on the cover will always seat flat against the rim throughout its entire circumference.

25 represents a hollow or chambered securing and protecting hood which overlies or encloses the cover 16 and is provided with a rim 26 which conforms to the marginal contour of the cover and is adapted to bear against the outer face of the gasket 17 opposite the manhole rim 15 so that by forcing or pressing the hood inwardly against the gasket or margin of the cover, the latter will be clamped between the rim of the hood and the rim of the manhole and will tightly seal the manhole and also the joint between the margin of the cover and the rim of the hood.

The hood is mounted to move toward and from the manhole and cover to permit the closing and opening of the hood and cover, preferably by hinging the hood on the hinge pin 19 for the cover. For this purpose, the hood shown has hinge lugs 27 which straddle the hinge arms 18 of the cover and are drilled for the passage of the hinge pin 19 therethrough. The hood may be secured in closed position by suitable means, such as a clamping bolt 28 and nut 29 located diametrically opposite to the hood hinge and adapted, as by tightening the nut 29, to force the hood toward the manhole rim so as to clamp the margin of the cover between said rim and the rim of the hood. The bolt 28 shown, is an eye bolt pivoted on the connecting pin 22 of the base ring 20, and the free end of the bolt is adapted, when the nut 29 is loosened, to swing in and out between lugs 30 on the hood on which the nut is adapted to bear when tightening it for securing the cover. Any other suitable securing or clamping device for the hood could be employed.

In order to equalize and distribute the pressure of the hood rim throughout its circumferential extent on the margin of the cover and to compensate for wear or permanent compression in the sealing gasket 17, the hood hinge is made adjustable to permit the hinge portion of the hood to be adjusted in or out toward or from the manhole rim. In the construction shown for this purpose, the ends of the hinge pin 19 extend into vertically elongated slots 31 in lugs 32 on the base ring 20 and are adjustably supported in these slots by adjusting screws 33 which turn in smooth holes in the lugs 32 and in threaded holes 34 in the ends of the hinge pin so that by turning the screws, the hinge pin can be adjusted in or out to place the axis of the hood hinge inwardly or outwardly relative to the plane of the manhole rim 15.

The hinge pin can be locked in adjusted position, as by lock nuts 35 screwed on the ends of the adjusting screws 33. The elongated slot 23 in the hinge arm of the cover 16 permits these adjustments of the hinge pin as well as allowing the before mentioned limited movement of the cover normal to the plane of the manhole rim independently of or relative to the hood.

By the construction described, both the cover and the hood are hinged to the tank by the same hinge pin; but the cover and hood are independently movable to open and close the manhole and, in addition, the cover 16 is permitted a limited movement normal to the plane of the manhole rim to insure that it will always bear flat against the rim throughout the circumference thereof, and the hinge axis of the hood is also adjustable toward and from the plane of the cover 16 so as to always insure uniform pressure of the rim of the hood throughout its circumferential extent on the gasket or margin of the cover, even though the gasket may vary in thickness due to wear or permanent compression thereof.

The cover 16 is shown as provided with a filling opening 36 and a closure device or fitting 37 therefor removably secured to the cover, as by bolts 38 and wing nuts 39 which permit the ready removal and fastening of the closure device for opening and closing the filling opening 36. A gasket or packing 40 on the closure device ensures the tight sealing of the filling opening. The closure device or fitting 37 shown is equipped with an air vent valve 41 which is adapted to admit air to prevent the formation of a vacuum in the tank and to close outwardly against a seat 42 to prevent escape or loss of the contents of the tank, due to splashing or the tipping or upsetting of the tank. As shown, the valve 41 is provided with a central stem passing through and adapted to slide freely in a guide hole in the fitting 37 and having at its outer end a nut 43 for limiting the downward or opening movement of the valve.

Outwardly beyond the valve seat, the fitting 37 is provided with screened vent openings 44. This filling and vent valve fitting is enclosed and protected by the hood 25 which would likewise cover and protect any other fitting or device with which the cover might be equipped so as to protect the same from dust or other contamination.

Locking means are preferably provided for the hood and cover-securing device. Such means in the construction shown consists of a padlock 45, the bow of which is adapted to be passed through a hole 46 in the threaded end of the securing bolt 28 and through registering slots 47 in the securing nut 29 to thus prevent the turning of the nut and the opening of the hood and manhole cover, except by first unlocking and removing the lock.

I claim as my invention:

1. The combination with a tank having a manhole, of a cover hinged to the tank and arranged to seat at its margin on the rim of the manhole, said cover having a limited movement normal to the plane of said cover seat, and a hood over the cover and mounted to swing independently of the cover and having a rim arranged to engage the margin of the cover substantially throughout its circumferential extent, and securing means which urges the hood to clamp the marginal portion of the cover between the hood and the cover seat.

2. A combined manhole cover and hood for tanks, comprising a hood mounted to move toward and from the manhole, a cover for the manhole within said hood and mounted and movable independently thereof toward and from the manhole, said hood having a rim arranged to engage the margin of the cover substantially throughout its circumferential extent, and securing means for urging the hood toward the cover and clamping the latter between the hood rim and the rim of the manhole.

3. A combined manhole cover and hood for tanks, comprising a hood hinged to swing toward and from the manhole, a cover for the manhole within said hood and hinged to swing independently thereof toward and from the manhole, a seat which the cover engages to close the manhole, said hood having a rim arranged to engage the margin of the cover at points disposed substantially throughout its circumferential extent, and securing means for urging the hood toward the cover and clamping the latter between said hood rim and the cover seat.

4. A combined manhole cover and hood for tanks, comprising a hood hinged to swing toward and from the manhole, a cover for the manhole within said hood and hinged to swing independently thereof about the same hinge axis as the hood toward and from the manhole, said hood having a rim arranged to bear on the margin of the cover substantially throughout its circumferential extent, and securing means for urging the hood toward the cover and clamping the latter between said hood rim and the rim of the manhole.

5. A combined manhole cover and hood for tanks, comprising a hood hinged to swing toward and from the manhole, a cover for the manhole within said hood and hinged to swing independently thereof toward and from the manhole, a seat which the cover engages to close the manhole, said hood having a rim arranged to engage the margin of the cover at points disposed substantially throughout its circumferential extent, said cover also having a limited independent movement normal to the plane of its seat and the hinge axis of said hood being adjustable toward and from the said plane, and securing means for urging the hood toward the cover and clamping the latter between said hood rim and the cover seat.

6. A combined manhole cover and hood for tanks, comprising a hood hinged to swing toward and from the manhole, a cover for the manhole within said hood and hinged to swing independently thereof toward and from the manhole, a seat which the cover engages to close the manhole, said hood having a rim arranged to engage the margin of the cover substantially throughout its circumferential extent, the hinges of said cover and hood having a common hinge pin and said cover having a limited movement normal to its seat on said hinge pin, and securing means for urging the hood toward the cover and clamping the latter between said hood rim and the cover seat.

7. A combined manhole cover and hood for tanks, comprising a hood hinged to swing toward and from the manhole, a cover for the manhole within said hood and hinged to swing independently thereof toward and from the manhole, a seat which the cover engages to close the manhole, said hood having a rim arranged to engage the margin of the cover substantially throughout its circumferential extent, the hinges of said cover and hood having a common hinge pin and said cover having a limited movement normal to its seat on said hinge pin, means for adjusting said hinge pin in a direction normal to the plane of the cover seat, and securing means for urging the hood toward the cover and clamping the latter between said hood rim and the cover seat.

8. A combined manhole cover and hood for tanks, comprising a hood hinged to swing toward and from the manhole, a cover for the manhole within said hood and hinged to swing independently thereof toward and from the manhole, a seat which the cover engages to close the manhole, said cover also having a limited movement relatively to the hood and normal to the plane of the cover seat, a fitting carried by said cover within the hood and communicating with the interior of the tank, said hood having a rim arranged to engage the margin of the cover at points disposed substantially throughout its circumferential extent, and securing means for urging the hood toward the cover and clamping the latter between said hood rim and the cover seat.

9. A combined manhole cover and protecting hood comprising a hood mounted to move toward and from the manhole, a cover for the manhole within the hood, a seat which the cover engages to close the manhole, said hood having a portion arranged to engage the cover, a securing screw and nut for urging the hood to clamp the cover between its seat and the hood, and a lock having a member passing through a hole in said screw and engaging said nut for locking the hood and cover in closed position.

RAYMOND J. NEELY.